(12) United States Patent
Mashima et al.

(10) Patent No.: US 11,333,814 B2
(45) Date of Patent: May 17, 2022

(54) LAMINATE

(71) Applicant: ZEON CORPORATION, Tokyo (JP)

(72) Inventors: Hiromu Mashima, Tokyo (JP); Takamichi Inomata, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 186 days.

(21) Appl. No.: 16/632,955

(22) PCT Filed: Jul. 23, 2018

(86) PCT No.: PCT/JP2018/027546
§ 371 (c)(1),
(2) Date: Jan. 22, 2020

(87) PCT Pub. No.: WO2019/022022
PCT Pub. Date: Jan. 31, 2019

(65) Prior Publication Data
US 2020/0158932 A1    May 21, 2020

(30) Foreign Application Priority Data

Jul. 25, 2017 (JP) .............................. JP2017-143266

(51) Int. Cl.
*G02B 5/30* (2006.01)
(52) U.S. Cl.
CPC .................. *G02B 5/3025* (2013.01)
(58) Field of Classification Search
CPC .. G02B 5/3025; G02B 5/3033; G02B 5/3041; G02B 5/305; G02B 5/30; G02B 1/04;
(Continued)

(56) References Cited

U.S. PATENT DOCUMENTS

| 5,143,979 A | 9/1992 | Nishi et al. |
| 5,187,012 A | 2/1993 | Takahashi et al. |

(Continued)

FOREIGN PATENT DOCUMENTS

| CN | 101080454 B | 10/2012 |
| CN | 107272102 A | 10/2017 |

(Continued)

OTHER PUBLICATIONS

Mar. 15, 2021, the Extended European Search Report issued by the European Patent Office in the corresponding European Patent Application No. 18838600.7.

(Continued)

*Primary Examiner* — Stephone B Allen
*Assistant Examiner* — Adam W Booher
(74) *Attorney, Agent, or Firm* — Kenja IP Law PC

(57) ABSTRACT

A layered body including a polarizer material film that is a product of stretching in one or more directions, and a substrate film provided on the polarizer material film, the substrate film being a product of stretching in one or more directions, wherein a stretching ratio X of the polarizer material film is 1.5 or more and 5.5 or less, a thickness T2 is 20 μm or less, the thickness T2 being a thickness of the polarizer material film as a result of free end uniaxial stretching of the layered body at a stretching ratio 6.0/X, an angle θ2 formed by a stretching direction of the polarizer material film and a stretching direction of the substrate film is less than 1°, and a stretching ratio Y of the substrate film is smaller than the stretching ratio X of the polarizer material film.

8 Claims, 3 Drawing Sheets

(58) Field of Classification Search
CPC ............... G02B 27/28; B32B 2307/42; B32B 2038/0028; B32B 27/06; B32B 27/08; B32B 27/32; B32B 27/325; B32B 27/308; B32B 27/36; B32B 7/02; B32B 7/022; B32B 7/023; B32B 7/03; B32B 7/035; G02F 2201/54; G02F 2202/02; G02F 2202/022; G02F 2202/023; G02F 2202/025; G02F 1/133528; G02F 1/133531

See application file for complete search history.

(56) References Cited

U.S. PATENT DOCUMENTS

| | | | |
|---|---|---|---|
| 5,366,812 | A | 11/1994 | Takahashi et al. |
| 6,342,549 | B1 | 1/2002 | Hirose et al. |
| 6,492,468 | B1 | 12/2002 | Chen et al. |
| 2003/0138654 | A1 | 7/2003 | Kido et al. |
| 2005/0213012 | A1* | 9/2005 | Yano .................. G02F 1/13363 349/141 |
| 2006/0078693 | A1* | 4/2006 | Ishibashi .............. G02B 5/3083 428/1.31 |
| 2007/0298194 | A1 | 12/2007 | Fukagawa et al. |
| 2008/0242812 | A1* | 10/2008 | Ruchatz ................ C08F 232/02 526/170 |
| 2012/0057232 | A1 | 3/2012 | Goto et al. |
| 2014/0307317 | A1* | 10/2014 | Jeon ..................... G02B 5/3025 359/489.07 |
| 2015/0070761 | A1 | 3/2015 | Kitagawa et al. |
| 2016/0013342 | A1* | 1/2016 | Koide ................... H01L 31/036 136/259 |
| 2016/0084990 | A1 | 3/2016 | Nam et al. |
| 2016/0146977 | A1 | 5/2016 | Ishiguro et al. |

FOREIGN PATENT DOCUMENTS

| | | | |
|---|---|---|---|
| EP | 0578822 | A1 | 1/1994 |
| JP | H02180976 | A | 7/1990 |
| JP | H03109418 | A | 5/1991 |
| JP | H03223328 | A | 10/1991 |
| JP | H04301415 | A | 10/1992 |
| JP | H05212828 | A | 8/1993 |
| JP | H07145213 | A | 6/1995 |
| JP | 2002105151 | A | 4/2002 |
| JP | 2006195242 | A | 7/2006 |
| JP | 2011013378 | A | 1/2011 |
| JP | 4691205 | B1 | 6/2011 |
| JP | 2015055705 | A | 3/2015 |
| JP | 2015203828 | A | 11/2015 |
| JP | 2016505404 | A | 2/2016 |
| WO | 0032646 | A1 | 6/2000 |
| WO | 0181957 | A1 | 11/2001 |
| WO | 2014204150 | A1 | 12/2014 |
| WO | 2015002020 | A1 | 1/2015 |

OTHER PUBLICATIONS

Oct. 23, 2018, International Search Report issued in the International Patent Application No. PCT/JP2018/027546.
Jan. 28, 2020, International Preliminary Report on Patentability issued in the International Patent Application No. PCT/JP2018/027546.

* cited by examiner

LAMINATE

FIELD

The present invention relates to a layered body.

BACKGROUND

As a display device such as a liquid crystal display device and an organic electroluminescent display device, a display device having a large surface area, light weight and thin thickness has been required in prior art. Therefore, as a panel constituting the display device, a thin panel has been required in prior art.

In a display device, a polarizing plate including a polarizer and a protective film for protecting the polarizer is generally used. In order to constitute a thin display device, a thinner polarizing plate is also required. In particular, materials generally used for a polarizer, such as polyvinyl alcohol, may shrink in a use environment of a display device. Such shrinkage may cause a problem of warping when the display device has a large surface area and thin thickness. Therefore, employment of a polarizer having a thickness as thin as 10 µm or less is expected to contribute to thickness reduction of the display device attributed to the thin thickness of the polarizer itself, and also contribute to reduction of the aforementioned occurrence of the warping.

However, when such a thin polarizer is produced from polyvinyl alcohol by a prior art production method, melt-breakage of the polarizer frequently occurs. As methods for producing a polarizing plate including a thin polarizer with which such melt-breakage of the polarizer can be avoided, some methods have been proposed. For example, Patent Literature 1 proposes a method in which a layered body is obtained by attaching an unstretched polyvinyl alcohol-based film to an unstretched high-density polyethylene substrate film, the layered body is then subjected to a stretching treatment, and the substrate film is separated therefrom to obtain a polyvinyl alcohol-based film.

Patent Literature 2 proposes a method in which an aqueous solution containing a polyvinyl alcohol-based resin is applied onto an amorphous ester-based thermoplastic resin substrate to form a polyvinyl alcohol-based resin layer and obtain a layered body, the layered body is then subjected to a stretching treatment, a dichroic material is oriented to obtain a colored layered body, and the colored layered body is subjected to a stretching treatment to obtain an optical film.

CITATION LIST

Patent Literature

Patent Literature 1: Japanese Translation of PCT Patent Application Publication No. 2016-505404 (corresponding publication: U.S. Patent Application Publication No. 2016/084990) Patent Literature 2: Japanese Patent No. 4691205 B (corresponding publication: U.S. Patent Application Publication No. 2012/057232)

SUMMARY

Technical Problem

When a thin polarizing plate is produced by the methods described in Patent Literatures 1 and 2, a phase difference may be generated in the substrate film after the stretching treatment due to stretching of the layered body at a high stretching ratio. In such a case, it is difficult to use the substrate film as it is as a polarizing plate protective film, and thus the substrate film is to be separated and discarded. Therefore, an unnecessary material may be generated. Further, it may have to perform additional operations in which a protective film for protecting the polarizing plate is separately prepared and the protective film is attached to the polarizing plate.

When it is desired to obtain a thin polarizing plate having a sufficiently wide width, a considerable measure therefor may be preparation of a substrate film having an extremely large width on which a material for a polarizer (for example, a polyvinyl alcohol material) is applied or attached. However, when the width of the substrate film is too large, a problem of difficulty in production arises.

Accordingly, it is an object of the present invention to provide a layered body whose substrate film can be used also as a protective film and with which a polarizing plate having a thin thickness can be efficiently produced.

Solution to Problem

In order to solve the aforementioned problems, the present inventor has made researches, and as a result found that the aforementioned problems can be solved by forming a layered body using a polarizer material film that is a product of stretching at a specific stretching ratio X and a substrate film that is a product of stretching at a stretching ratio Y that is smaller than X, wherein an angle formed by a stretching direction of the polarizer material film and a stretching direction of the substrate film is less than 1°. The present invention has thus been completed.

Accordingly, the present invention provides the following <1> to <9>.

<1> A layered body comprising a polarizer material film that is a product of stretching in one or more directions, and a substrate film provided on the polarizer material film, the substrate film being a product of stretching in one or more directions, wherein a stretching ratio X of the polarizer material film is 1.5 or more and 5.5 or less, a thickness T2 is 20 µm or less, the thickness T2 being a thickness of the polarizer material film as a result of free end uniaxial stretching of the layered body at a stretching ratio 6.0/X, an angle θ2 formed by a stretching direction of the polarizer material film and a stretching direction of the substrate film is less than 1°, and a stretching ratio Y of the substrate film is smaller than the stretching ratio X of the polarizer material film.

<2> The layered body according to <1>, wherein the polarizer material film is a polarizer material film obtained by dry stretching.

<3> The layered body according to <1> or <2>, wherein an Nz factor of the polarizer material film is 0.95 or more and 1.5 or less.

<4> The layered body according to any one of <1> to <3>, wherein an in-plane phase difference Re2 of the substrate film is 0 nm or more and 20 nm or less, the Re2 being an in-plane phase difference generated as a result of free end uniaxial stretching of the substrate film at 4.0 times under a temperature condition of 50° C. to 120° C.

<5> The layered body according to any one of <1> to <4>, wherein the substrate film is a film formed of at least one type selected from a cycloolefin resin, an amorphous polyester resin, a polyolefin resin, and an acrylic resin.

<6> The layered body according to any one of <1> to <5>, wherein
the substrate film is a film formed of a cycloolefin resin,
the cycloolefin resin contains a cycloolefin-based polymer, and
the cycloolefin-based polymer is formed of at least one type selected from a hydrogenated product of a ring opening polymer of a norbornene-based monomer, an addition copolymer of a norbornene-based monomer and an α-olefin, and a hydrogenated product thereof.
<7> The layered body according to any one of <1> to <5>, wherein
the substrate film is a film formed of a cycloolefin resin,
the cycloolefin resin contains a cycloolefin-based polymer, and
the cycloolefin-based polymer is composed of a hydrogenated product of a block copolymer obtained by hydrogenating a block copolymer [D] composed of:
a polymer block [A] containing a repeating unit [I] derived from an aromatic vinyl compound as a main component; and
a polymer block [B] containing the repeating unit [I] derived from an aromatic vinyl compound and a repeating unit [II] derived from a chain conjugated diene compound as a main component or a polymer block [C] containing the repeating unit [II] derived from a chain conjugated diene compound as a main component.
<8> The layered body according to any one of <1> to <7>, wherein the substrate film contains a plasticizer and/or a softener.
<9> The layered body according to <8>, wherein the plasticizer and/or softener is an ester-based plasticizer, an aliphatic hydrocarbon polymer or a mixture thereof.

Advantageous Effects of Invention

With the polarizing plate obtained by stretching of the layered body of the present invention, the phase difference expressed in the substrate film can be confined in a small degree even after a step of stretching the layered body, and occurrence of rupture can be prevented. Thus, the present invention can provide a layered body whose substrate film can be used also as a protective film and with which a polarizing plate having a thin thickness can be efficiently produced.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the present application, a "long-length" film refers to a film with the length that is 5 times or more the width of the film, and preferably a film with the length that is 10 times or more the width, and specifically refers to a film having a length that allows a film to be wound up into a rolled shape for storage or transportation. The upper limit of the ratio of the length of the film to the width thereof is not particularly limited, but is 100,000 times or less the width thereof, for example.

In the present application, a phase difference Re of a film in the in-plane direction and a phase difference Rth thereof in the thickness direction are calculated by the formulae $Re=(nx-ny) \times d$ and $Rth=\{(nx+ny)/2-nz\} \times d$. An NZ factor of a film is a value represented by $[(nx-nz)/(nx-ny)]$ and may also be represented by $[(Rth/Re)+0.5]$. Herein, nx represents a refractive index in a slow axis direction in a plane of a film (a maximum refractive index given in the plane), ny represents a refractive index in a direction orthogonal to the slow axis direction in the plane of the film, nz represents a refractive index in the thickness direction of the film, and d represents the thickness (nm) of the film. The measurement wavelength is 590 nm, which is a representative wavelength in a visible light region, unless otherwise specified.

[1. Summary of Layered Body]

Figure 1:
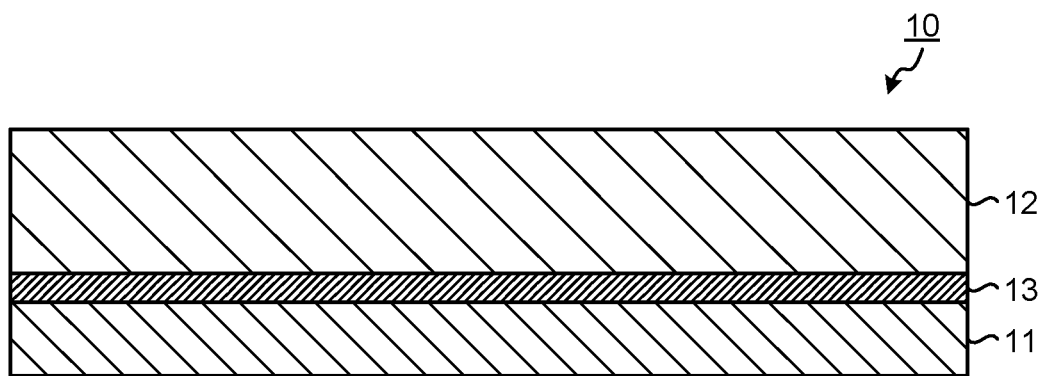
FIG. 1 is a cross-sectional view schematically illustrating an example of the layered body of the present invention.

FIG. 1 is an example of a cross-sectional view schematically illustrating a layered body 10 of the present invention. As illustrated in FIG. 1, the layered body 10 of the present invention has a polarizer material film 11 that is a product of stretching in one or more directions at a stretching ratio X, and a substrate film 12 provided on the polarizer material film, the substrate film being a product of stretching in one or more directions at a stretching ratio Y that is smaller than X. In FIG. 1, 13 refers to an adhesive for effecting adhesion of the polarizer material film 11 and the substrate film 12.

The layered body 10 of the present invention may be used as a material for producing a polarizing plate.

[2. Polarizer Material Film]

The polarizer material film is a film to be used for producing a polarizer (film for a polarizer). In the present invention, it is preferable that the polarizer material film is a film having a phase difference Re1 in an in-plane direction of 10 nm or more and a thickness T1 of 40 μm or less. The polarizer material film is a film obtained by a stretching treatment of an unstretched film containing a material for a polarizer such that the in-plain direction phase difference thereof becomes 10 nm or more, and the thickness thereof becomes 40 μm or less. The polarizer material film is a (stretched) film containing a material for a polarizer. In the present application, a film for obtaining the polarizer material film which has not yet been subjected to a stretching treatment for giving the specific phase difference and the thickness (an unstretched film containing a material for a polarizer) may be referred to as "primary film" for the sake of distinguishing it from the polarizer material film.

In the present invention, the primary film is not particularly limited as long as it is one that is capable of achieving the object of the present invention. The primary film is preferably a film of a polyvinyl alcohol resin in terms of high cost performance.

In the present invention, the polyvinyl alcohol resin (hereinafter sometimes abbreviated as PVA) is not necessarily limited. In terms of availability and the like, it is preferable to use a product obtained by saponification of polyvinyl acetate obtained by polymerization of vinyl acetate. From the viewpoint of excellent stretching property and excellent polarization performance of the film to be obtained, it is preferable that the polymerization degree of PVA falls within a range of 500 to 8,000 and the saponification degree thereof is 90% by mole or more. Herein, the polymerization degree is an average polymerization degree measured in accordance with the description of JIS K6726-1994, and the saponification degree is a value measured in accordance with the description of JIS K6726-1994. The range of the polymerization degree is more preferably from 1,000 to 6,000, and further preferably from 1,500 to 4,000. The range of the saponification degree is more preferably 95% by mole or more, and further preferably 99% by mole or more. PVA may be a copolymer of vinyl acetate and a copolymerizable monomer or a graft polymer as long as the advantageous effects of the present invention are adversely affected.

In the present invention, a method for producing a primary film of PVA is not particularly limited, and the primary film of PVA may be produced by a publicly known method. Examples of the optional methods to be adopted may include a casting film formation method, a wet film formation method (discharging into a poor solvent), a dry-wet film formation method, a gelation film formation method (a method in which a PVA aqueous solution is cooled and once gelled, and then the solvent is extracted and removed to obtain the primary film of PVA), which use a PVA solution obtained by dissolving PVA in a solvent as a film formation stock solution; a method based on a combination thereof; and a melt-extrusion film formation method using a film stock solution obtained by melting PVA containing a solvent. Among these methods, the casting film formation method and the melt-extrusion film formation method are preferable since a highly transparent, less colored primary film of PVA is obtained. The melt-extrusion film formation method is more preferable.

In the present invention, in order to improve the mechanical properties, the process-passing property in secondary processing, and the like, it is preferable that the primary film of PVA contains a plasticizer including a polyhydric alcohol such as glycerin in an amount of 0.01 to 30% by weight relative to the amount of PVA. In order to improve the handling property, the film appearance, and the like, it is preferable that the primary film of PVA contains a surfactant such as an anionic surfactant or a nonionic surfactant in an amount of 0.01 to 1% by weight relative to the amount of PVA.

If necessary the primary film of PVA may further contain other components such as an antioxidant, an ultraviolet absorber, a lubricant, a pH adjuster, inorganic substance particles, a colorant, an antiseptic, a mildewproofing agent, a polymer compound other than the aforementioned components, and a moisture content, within a range that does not impair the advantageous effects of the present invention. The primary film of PVA may contain one type or two or more types of these optional components.

The thickness of the primary film is preferably 50 μm or less, more preferably 40 μm or less, and further preferably 30 μm or less, and is preferably 5 μm or more, more preferably 10 μm or more, and further preferably 15 μm or more. When the thickness of the primary film is equal to or more than the lower limit value of the aforementioned range, a polarizing plate having a sufficiently high polarization degree can be obtained. When it is equal to or less than the upper limit value of the aforementioned range, the resistance of a polarizing plate against bending can be effectively enhanced.

The polarizer material film is obtained by subjecting the primary film to a stretching treatment. Examples of a method for the stretching treatment may include dry stretching and wet stretching. Since dry stretching is simpler than wet stretching in terms of equipment and process, the polarizer material film is preferably one obtained by dry stretching. As dry stretching, a stretching method such as a tenter stretching, a floating stretching, and a thermal roll stretching may be used. The dry stretching is a stretching treatment method in which stretching is performed in an atmosphere of a gas of high temperature (for example, 100° C. or higher). Examples of the gas used in the dry stretching may include air.

The stretching conditions under which the primary film is stretched to obtain the polarizer material film may be appropriately selected so that a desired polarizer material film is obtained. For example, the manner of stretching when the primary film is stretched to obtain the polarizer material film may be any optional manner of uniaxial stretching, biaxial stretching, and the like. When the primary film is a long-length film, the stretching direction may be any of a longitudinal direction (a direction parallel to the lengthwise direction of the long-length film), a transverse direction (a direction parallel to the widthwise direction of the long-length film), and an oblique direction (a direction that is not the longitudinal direction or the transverse direction).

The stretching ratio X upon the stretching of the primary film for obtaining the polarizer material film is 1.5 or more, preferably 2.0 or more, and further preferably 2.5 or more, and is 5.5 or less, preferably 4.5 or less, and further preferably 3.5 or less. That is, the polarizer material film is a film obtained by stretching at a stretching ratio X of 1.5 or more and 5.5 or less, preferably a film obtained by stretching at a stretching ratio X of 2.0 or more and 4.5 or less, and further preferably a film obtained by stretching at a stretching ratio X of 2.5 or more and 3.5 or less. When the stretching ratio X is equal to or less than the upper limit value of the aforementioned range, occurrence of rupture when the primary film is stretched to obtain the polarizer material film can be prevented. When the stretching ratio X is equal to or more than the lower limit value of the aforementioned range, the stretching ratio when the layered body is stretched to obtain the polarizing plate can be decreased. When the primary film is stretched in two or more directions by biaxial stretching or the like, the stretching ratio X is a product of ratios of stretching in the respective directions.

When the primary film is subjected to dry stretching to obtain the polarizer material film, the stretching temperature is preferably 100° C. or higher, and more preferably 110° C. or higher, and is preferably 150° C. or lower, and more preferably 140° C. or lower. When the temperature of dry stretching falls within the aforementioned range, a polarizer material film having uniform thickness is obtained.

The thickness T1 of the polarizer material film is preferably 40 μm or less, preferably 30 μm or less, and more preferably 20 μm or less, and is preferably 3 μm or more, and more preferably 5 μm or more. When the thickness T1 of the polarizer material film is equal to or more than the lower limit value of the aforementioned range, a polarizing plate having a sufficiently high polarization degree can be obtained. When it is equal to or less than the upper limit value of the aforementioned range, the resistance of the polarizing plate to bending can be effectively enhanced.

The shape and size of the polarizer material film may be appropriately adjusted according to desired use. In terms of efficiency of production, it is preferable that the polarizer material film is a long-length film.

The phase difference Re1 in the in-plane direction of the polarizer material film is preferably 10 nm or more, more preferably 50 nm or more, and further preferably 100 nm or more, and is preferably 500 nm or less, and more preferably 400 nm or less. When the phase difference Re1 in the in-plane direction of the polarizer material film is equal to or more than the lower limit value of the aforementioned range, the stretching ratio when the layered body is subjected to a stretching treatment to obtain the polarizing plate is decreased, and thus the phase difference of the substrate after the stretching treatment can be kept at a low level. When the phase difference Re1 in the in-plane direction of the polarizer material film is equal to or less than the upper limit value of the aforementioned range, the stretching ratio when the primary film is stretched to obtain the polarizer material film can be decreased, and thus problems such as occurrence of wrinkle in stretching the primary film alone can be avoided.

The Nz factor of the polarizer material film is preferably 0.95 or more, and more preferably 0.99 or more, and is preferably 1.5 or less, and more preferably 1.4 or less. When the Nz factor falls within the aforementioned range, a polarizer having a sufficient polarization degree can be obtained.

[3. Substrate Film]

In the layered body of the present invention, a film that has been stretched in one or more directions is used as the substrate film. In the present specification, the film before obtaining the substrate film (the film before stretching treatment) is also referred to as "unstretched film" for the sake of distinguishing it from the substrate film.

The thickness of the substrate film is preferably 5 μm or more, and more preferably 10 μm or more, and is preferably 50 μm or less, and more preferably 30 μm or less. When the thickness of the substrate film is equal to or more than the lower limit value of the aforementioned range, a layered body having a good bonded surface state can be obtained. When the thickness is equal to or less than the upper limit value of the aforementioned range, the phase difference generated in the substrate film when the layered body is stretched to obtain the polarizing plate can be reduced.

As to the substrate film, an in-plane phase difference Re2 thereof is preferably 0 nm or more and 20 nm or less, and more preferably 10 nm or less, wherein the Re2 is an in-plane phase difference generated as a result of free end uniaxial stretching of the substrate film at 4.0 times under a temperature condition of 50° C. to 120° C. When the in-plane direction phase difference Re2 of the substrate film is in the aforementioned range, phase difference expression of the substrate film can be made at a sufficiently low level even after the step of producing the polarizing plate including the stretching treatment.

The substrate film is formed of a resin. The resin forming the substrate film is not particularly limited. The substrate film is preferably a film formed of at least one type selected from a cycloolefin resin, an amorphous polyester resin, a polyolefin resin, and an acrylic resin, and more preferably a film formed of a cycloolefin resin.

Preferable cycloolefin resins forming the substrate film are those containing a cycloolefin-based polymer, and the cycloolefin-based polymer is a hydrogenated product of a ring opening polymer of a norbornene-based monomer, an addition copolymer of a norbornene-based monomer and an α-olefin, and a hydrogenated product thereof. Among these, preferable cycloolefin-based polymers are an addition copolymer of a norbornene-based monomer and an α-olefin and a hydrogenated product thereof from the viewpoint of low tendency to express a phase difference even when stretched. Examples of the hydrogenated product of the ring opening polymer of a norbornene-based monomer, the addition copolymer of a norbornene-based monomer and an α-olefin, and/or the hydrogenated product thereof may include the polymer compounds described in Japanese Patent Application Laid-Open No. Hei. 2-180976 A, Japanese Patent Application Laid-Open No. Hei. 3-109418 A, Japanese Patent Application Laid-Open No. Hei. 3-223328 A, Japanese Patent Application Laid-Open No. Hei. 4-301415 A, Japanese Patent Application Laid-Open No. Hei. 5-212828 A, and Japanese Patent Application Laid-Open No. Hei. 7-145213 A.

The cycloolefin resin forming the substrate film preferably contains a cycloolefin-based polymer, and the cycloolefin-based polymer is composed of a hydrogenated product of a block copolymer obtained by hydrogenating carbon-carbon unsaturated bonds in the main chain and the side chain and carbon-carbon unsaturated bonds in aromatic rings of a block copolymer [D] composed of: a polymer block [A] containing a repeating unit [I] derived from an aromatic vinyl compound as a main component; and a polymer block [B] containing the repeating unit [I] derived from an aromatic vinyl compound and a repeating unit [II] derived from a chain conjugated diene compound as a main component or a polymer block [C] containing the repeating unit [II] derived from a chain conjugated diene compound as a main component. Examples of such a hydrogenated product of the block copolymer may include polymer compounds described in International Publication No. 2000/32646, International Publication No. 2001/081957, Japanese Patent Application Laid-Open No. 2002-105151 A, Japanese Patent Application Laid-Open No. 2006-195242 A, Japanese Patent Application Laid-Open No. 2011-13378 A, and International Publication No. 2015/002020.

[3.1. Plasticizer and Softener]

In the present invention, it is preferable that the substrate film contains a plasticizer and/or a softener (one or both of the plasticizer and the softener). When the substrate film contains a plasticizer and/or a softener, it is possible to reduce the phase difference generated in the substrate film when the layered body is stretched to obtain a polarizing plate.

As the plasticizer and the softener, those which can be uniformly dissolved or dispersed in the resin forming the substrate film may be used. Specific examples of the plasticizer and softener may include an ester-based plasticizer such as an ester-based plasticizer composed of a polyhydric alcohol and a monovalent carboxylic acid (hereinafter referred to as a "polyhydric alcohol ester-based plasticizer") and an ester-based plasticizer composed of a polyvalent carboxylic acid and a monohydric alcohol (hereinafter referred to as "polyvalent carboxylic acid ester-based plasticizer"), as well as a phosphoric acid ester-based plasticizer, a hydrocarbon ester-based plasticizer, and other polymer softeners.

Examples of the polyhydric alcohol which is a raw material for the ester-based plasticizer preferably used in the present invention are not particularly limited, and may preferably include ethylene glycol, glycerin, and trimethylolpropane.

Examples of the polyhydric alcohol ester-based plasticizer may include an ethylene glycol ester-based plasticizer, a glycerin ester-based plasticizer, and other polyhydric alcohol ester-based plasticizers.

Examples of the polyvalent carboxylic acid ester-based plasticizer may include a dicarboxylic acid ester-based plasticizer and other polyvalent carboxylic acid ester-based plasticizers.

Specific examples of the phosphoric acid ester-based plasticizer may include a phosphoric acid alkyl ester such as triacetyl phosphate and tributyl phosphate; a phosphoric acid cycloalkyl ester such as tricyclopentyl phosphate and cyclohexyl phosphate; and a phosphoric acid aryl ester such as triphenyl phosphate and tricresyl phosphate.

Specific examples of the hydrocarbon ester-based plasticizer may include glucose pentaacetate, glucose pentapropionate, glucose pentabutyrate, saccharose octaacetate, and saccharose octabenzoate, among which saccharose octaacetate is more preferable.

Examples of the polymer softener may include an aliphatic hydrocarbon polymer, an alicyclic hydrocarbon polymer, an acryl-based polymer such as polyethylacrylate, polymethylmethacrylate, a copolymer of methyl methacrylate and 2-hydroxyethyl methacrylate, and a copolymer of methyl methacrylate, methyl acrylate and 2-hydroxyethyl methacrylate; a vinyl-based polymer such as polyvinyl isobutyl ether and poly(N-vinylpyrrolidone); a styrene-based polymer such as polystyrene and poly(4-hydroxystyrene); polyester such as polybutylene succinate, polyethylene terephthalate, and polyethylene naphthalate; polyether such as polyethylene oxide and polypropylene oxide; and polyamide, polyurethane, and polyurea.

Specific examples of the aliphatic hydrocarbon-based polymer may include a low molecular weight polymer such as polyisobutylene, polybutene, poly-4-methylpentene, poly-1-octene, and an ethylene α-olefin copolymer and hydrogenated products of these; and a low molecular weight polymer such as polyisoprene, and a polyisoprene-butadiene copolymer and hydrogenated products of these. The aliphatic hydrocarbon-based polymer preferably has a number-average molecular weight of 300 to 5,000 from the viewpoint of being easily dissolved or dispersed uniformly in the cycloolefin resin.

The polymer softener may be a homopolymer composed of one type of repeating unit or a copolymer having a plurality of repeating structures. Two or more of the aforementioned polymers may be used in combination.

In the present invention, as the plasticizer and/or the softener, an ester-based plasticizer, an aliphatic hydrocarbon-based polymer, and a mixture thereof are preferable.

The ratio of the plasticizer and/or softener (hereinafter also referred to as "plasticizer or the like") in the substrate film is preferably 0.2 part by weight or more, more preferably 0.5 part by weight or more, and still more preferably 1.0 part by weight or more, and is preferably 40 parts by weight or less, and more preferably 30 parts by weight or less, relative to 100 parts by weight of the resin forming the substrate film. By setting the ratio of the plasticizer or the like within the aforementioned range, phase difference expression of the substrate film can be made at a sufficiently low level even after the step of producing the polarizing plate including the stretching treatment.

[3.2. Optional Components]

The substrate film may contain optional components in addition to the resin and the plasticizer and the like. Examples of the optional components may include a stabilizer such as an antioxidant, an ultraviolet absorber, and a light stabilizer; a resin modifier such as a lubricant; a colorant such as a dye and a pigment; and an antistatic agent. As these agents added, one type may be solely used, and two or more types may be used in combination, and the added amount thereof is appropriately selected within a range that does not impair the object of the present invention.

[4. Method for Producing Substrate Film]

The substrate film may be produced by molding a composition (hereinafter also referred to as "resin composition") containing components for forming the substrate film (a resin and a component to be added if necessary) into a film shape by any optional molding method to produce an unstretched film, and then stretching the unstretched film.

Examples of a method for molding the resin composition into a film shape may include melt-extrusion molding. A melt-extrusion step may be performed by a method in which the resin composition is melted with an extruder and extruded from a T-die attached to the extruder into a film shape, and the extruded film is brought into close contact with one or more cooling rollers to be molded, and then taken up. The molding conditions in melt-extrusion molding may be appropriately set according to conditions such as the composition and molecular weight of the resin composition used and the like.

The thickness of the unstretched film may be appropriately set in accordance with the use purpose thereof, etc. The thickness of the unstretched film is preferably 10 μm or more, and more preferably 15 μm or more, and is preferably 100 μm or less, and more preferably 50 μm or less. The unstretched film may be wound up in a form of a roll to be subjected to the subsequent steps. Alternatively, the film may be subjected to a stretching step that is continuously subsequent to a melt extrusion step.

The stretching conditions under which the unstretched film is stretched to obtain the substrate film may be appropriately selected so that a desired substrate film is obtained.

The manner of stretching when the unstretched film is stretched to obtain the substrate film may be any optional manner of uniaxial stretching, biaxial stretching, and the like. When the unstretched film is a long-length film, the stretching direction may be any of a longitudinal direction (a direction parallel to the lengthwise direction of the long-length film), a transverse direction (a direction parallel to the widthwise direction of the long-length film), and an oblique direction (a direction that is not the longitudinal direction or the transverse direction).

In the present invention, an angle θ2 formed by a stretching direction of the polarizer material film and a stretching direction of the substrate film is less than 1°.

For calculating θ2, when the polarizer material film is a film obtained by stretching the primary film in two or more directions, and when the substrate film is a film obtained by stretching the unstretched film in two or more directions, the stretching direction of larger stretching ratio is adopted as the stretching direction of the film.

In the present invention, the stretching ratio Y upon stretching the unstretched film for obtaining the substrate film is set to a smaller value than the stretching ratio upon stretching the primary film for obtaining the polarizer material film. When the stretching ratio Y is larger than the stretching ratio X, the substrate film ruptures upon stretching the layered body at the ratio of 6.0/X times.

The stretching ratio Y is preferably 1.1 or more, and more preferably 1.2 or more, and is preferably 5.0 or less, and more preferably 4.0 or less.

[5. Method for Producing Layered Body]

Subsequently, an example of a method for producing the layered body of the present invention will be described. The method for producing the layered body include a step (a) of stretching the primary film in one or more directions to obtain a polarizer material film, a step (h) of stretching the unstretched film to obtain a substrate film, and a step (b) of providing the substrate film layer on the polarizer material film to obtain a layered body.

Figure 2:
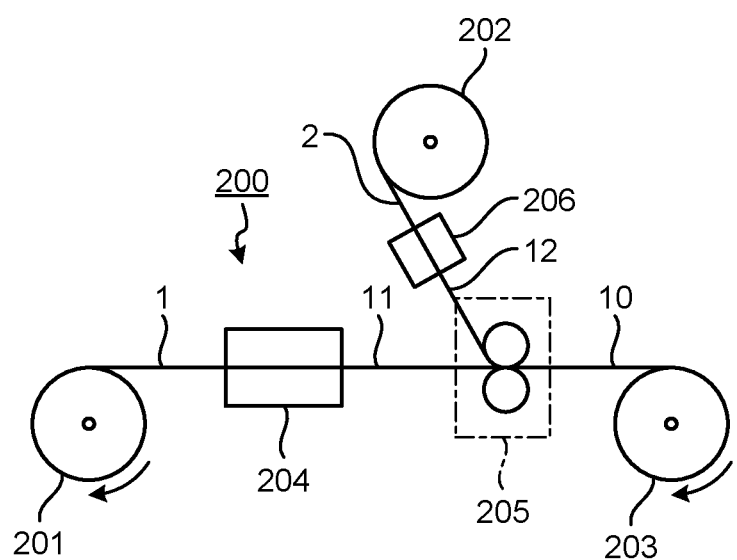
FIG. 2 is a view schematically illustrating an example of steps of producing the layered body of the present invention.

FIG. 2 is a schematic view schematically illustrating an example of a production apparatus 200 for forming the substrate film 12 on the polarizer material film 11 to produce the layered body 10. The production apparatus 200 is provided with feeding devices 201 and 202, a stretching device 204 and 206, a bonding device 205, and a winding device 203.

As illustrated in FIG. 2, a primary film 1 fed from the feeding device 201 is conveyed to the stretching device 204, and is subjected to a stretching treatment in the stretching device 204, to obtain the polarizer material film 11 (step (a)). Separately, an unstretched film 2 fed from the feeding device 202 is conveyed to the stretching device 206, and is subjected to a stretching treatment in the stretching device 206, to obtain the substrate film 12 (step (h)).

Subsequently, the polarizer material film 11 is conveyed to the bonding device 205. In the bonding device 205, an adhesive 13 is applied onto the polarizer material film 11 if necessary, and the polarizer material film 11 is bonded to the substrate film 12 to obtain the layered body 10 (step (b)). The layered body 10 thus produced is wound up by the winding device 203 to thereby constitute a form of a roll, and the roll can be subjected to further processing. In the step (b), the adhesive is an optional component. Alternatively, in the step (b), the adhesive may be applied onto the substrate film, and the substrate film may be then bonded to the polarizer material film.

The application of the adhesive between the polarizer material film and the substrate film is preferable since problems such as separation between these films can thereby be prevented. However, when sufficient adhesion force between the polarizer material film and the substrate film is obtained without the adhesive, the adhesive does not have to be used.

It is preferable that the stretching treatment of the primary film in the step (a) is performed in accordance with the methods and conditions (the method for a stretching treatment, the manner of stretching, the stretching ratio, the stretching temperature) described in
[2. Polarizer Material Film].

It is preferable that the stretching treatment of the substrate film in the step (h) is performed in accordance with the methods and conditions (the method for a stretching treatment, the manner of stretching, the stretching ratio, the stretching temperature) described in
[4. Method for Producing Substrate Film]

The stretching treatment in step (a) and the stretching treatment in step (h) are performed such that the angle θ2 formed by a stretching direction of the polarizer material film and a stretching direction of the substrate film becomes less than 1°. When θ2 is 1° or more, the absorption axis direction of the polarizer tends to be fluctuated. The angle θ2 is preferably less than 0.5°, and more preferably 0°. Allowable error for θ2 is usually in a range of ±0.5°, and more preferably in a range of ±0.3°.

In the step (b), there is no particular limitation to the adhesive 13 for bonding the polarizer material film 11 and the substrate film 12. Examples thereof may include an acryl-based adhesive, a urethane-based adhesive, a polyester-based adhesive, a polyvinyl alcohol-based adhesive, a polyolefin-based adhesive, a modified polyolefin-based adhesive, a polyvinyl alkyl ether-based adhesive, a rubber-based adhesive, a vinyl chloride-vinyl acetate-based adhesive, an SEBS (styrene-ethylene-butylene-styrene copolymer) based adhesive, an ethylene-based adhesive such as an ethylene-styrene copolymer, and an acrylic acid ester-based adhesive such as an ethylene-(meth)acrylic acid methyl ester copolymer and an ethylene-(meth)acrylic acid ethyl ester copolymer.

The surface to be bonded to the polarizer material film of the substrate film may be subjected to an adhesion facilitating treatment such as a corona treatment, a saponification treatment, a primer treatment, or an anchor coating treatment.

The layered body 10 of the present invention may be used as a material for producing the polarizing plate. In this case, the layered body is subjected to treatments such as a stretching treatment and a dyeing treatment, to form the polarizing plate.

[6. Method for Producing Polarizing Plate]

The method for producing the polarizing plate includes the aforementioned steps (a) and (b), and a step (c) of stretching the layered body, which has been obtained by the steps (a) and (b), in one or more directions. The method for producing the polarizing plate may include, after the step (b), a step (d) of dyeing the polarizer material film with a dichroic material. The dyeing of the polarizer material film may be performed for the polarizer material film before forming the layered body 10. By such a production method, the polarizer material film is stretched, further optionally dyed, and as a result becomes a film that is capable of functioning as a polarizer. The method for producing the polarizing plate may include further optional steps. Examples of the optional steps may include, after the step (c), a step (e1) of bonding a protective film directly or via an adhesive to the polarizer material film, and a step (e2) of providing a tackiness agent layer on the polarizer material film.

Figure 3:
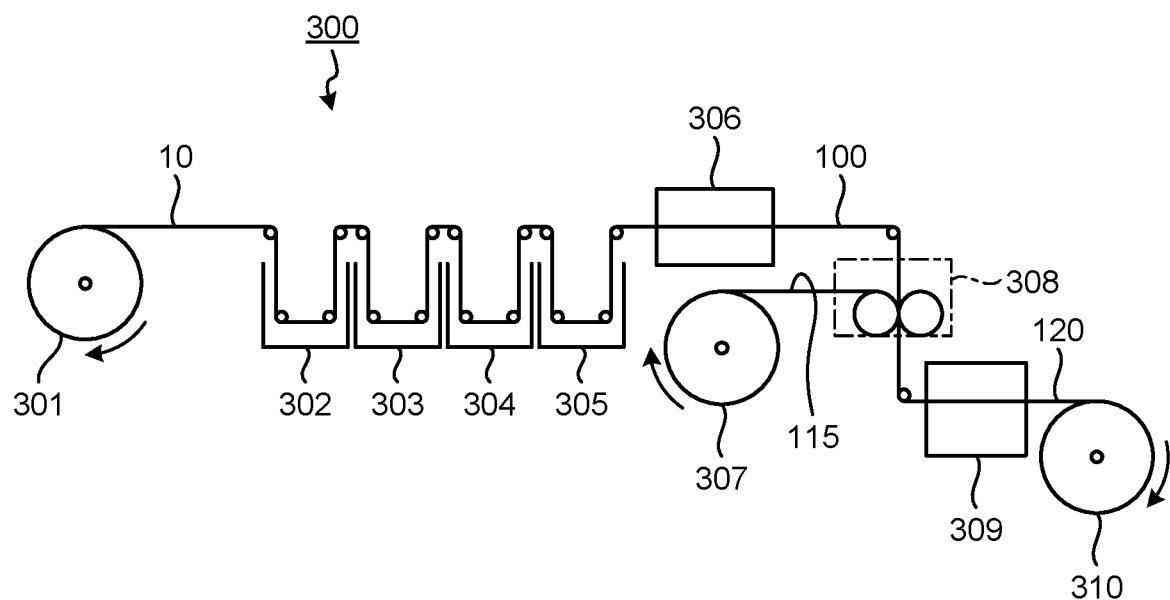
FIG. 3 is a view schematically illustrating an example of steps of producing a polarizing plate using the layered body of the present invention.

The polarizing plate may be produced by, for example, a production apparatus illustrated in FIG. 3.

FIG. 3 is a schematic view schematically illustrating an example of a production apparatus 300 for producing the polarizing plate 100 by performing a stretching treatment and the other optional treatment of the layered body 10. The production apparatus 300 is provided with feeding devices 301 and 307, treatment devices 302 to 305, drying devices 306 and 309, a bonding device 308, and a winding device 310.

As illustrated in FIG. 3, the layered body 10 fed from the feeding device 301 is conveyed to the treatment devices 302 to 305, and subjected to treatments such as a dyeing treatment (step (d)) and a stretching treatment (step (c)). After drying the layered body after the treatments in the drying device 306, the polarizing plate 100 is obtained.

Figure 4:
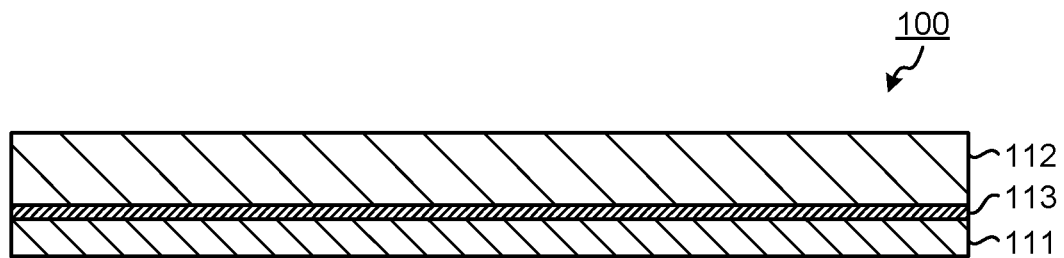
FIG. 4 is a cross-sectional view schematically illustrating a polarizing plate produced with the layered body of the present invention.

FIG. 4 is a cross-sectional view schematically illustrating a polarizing plate 100 obtained by the use of the layered body of the present invention. In the polarizing plate 100, a substrate film 112 is layered on one surface (the upper surface in the drawing) of a polarizer material film 111, as illustrated in FIG. 4. In FIG. 4, a reference numeral 113 denotes an adhesive layer. The polarizing plate 100 illustrated in FIG. 4 as it is may be used as a polarizing plate, although a protective film may be layered on the side of the polarizer material film 111 on the side where the substrate film 112 is not layered (the lower surface in the drawing).

When a protective film 115 is layered on the polarizer material film 111, as illustrated in FIG. 3, the polarizing plate 100 is conveyed to a bonding device 308, an adhesive is applied onto the surface of the polarizer material film 111 on the side where the substrate film 112 is not layered, and the protective film 115 fed from a feeding device 307 is bonded thereto, to thereby obtain the polarizing plate 120 including the protective film 115 (step (e1)). The polarizing plate 120 thus produced is wound up by a winding device 310 to thereby constitute a form of a roll, and the roll can be subjected to further processing.

Figure 5:
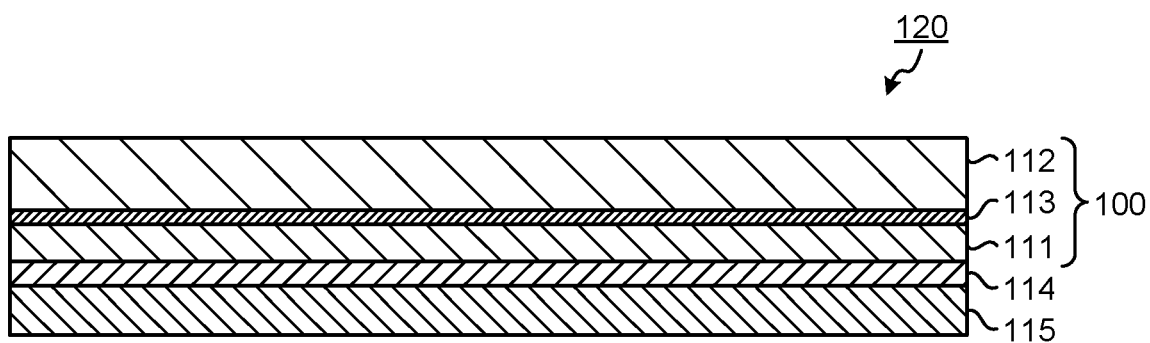
FIG. 5 is a cross-sectional view schematically illustrating a polarizing plate produced with the layered body of the present invention.

FIG. 5 is a cross-sectional view schematically illustrating a polarizing plate 120 having the protective film 115. In this polarizing plate 120, as illustrated in FIG. 5, a substrate film 112 is layered on one surface (the upper surface in the drawing) of a polarizer material film 111, and a protective film 115 is layered on the other surface side (the lower surface in the drawing) of the polarizer material film 111. In FIG. 5, reference numerals 113 and 114 each denote an adhesive. As the adhesive for bonding the protective film to the polarizer material film, an adhesive that is the same as that for bonding the substrate film to the polarizer material film may be used.

The method for the stretching treatment when the polarizing plate is produced using the layered body of the present invention is not particularly limited, and wet stretching is preferable. When the polarizing plate is produced by the wet stretching using the layered body of the present invention, the stretching ratio is preferably 1.2 or more, and more preferably 1.5 or more, and preferably 5.0 or less, and more preferably 4.0 or less. When the stretching ratio of the layered body is equal to or less than the upper limit value of the aforementioned range, expression of the phase difference of the substrate film can be decreased even after the step of producing the polarizing plate including the stretching treatment, and occurrence of rupture of the polarizing plate can be prevented. When the stretching ratio is equal to or more than the lower limit value of the aforementioned range, a polarizing plate having sufficient polarization performance can be obtained.

The stretching temperature of the layered body is not particularly limited. For example, when a polyvinyl alcohol-based resin is used as the material for the polarizer, the specific stretching temperature is preferably 50° C. or higher, more preferably 55° C. or higher, and particularly preferably 60° C. or higher, and is preferably 160° C. or lower, more preferably 120° C. or lower, and particularly preferably 110° C. or lower. When the stretching temperature is equal to or more than the lower limit value of the aforementioned range, stretching can be smoothly performed. When it is equal to or less than the upper limit value of the aforementioned range, effective orientation can be performed by the stretching. The aforementioned range of stretching temperature is preferable for both the dry stretching method and the wet stretching method, although the range is particularly preferable for the case of the wet stretching.

The stretching treatment of the layered body is a treatment including stretching in at least one direction, and may include stretching only in one direction or stretching in two or more directions. The stretching treatment of the layered body is preferably uniaxial stretching, further preferably free end uniaxial stretching, and particularly preferably free end uniaxial stretching in a longitudinal direction. In the stretching treatment including only stretching in one direction, stretching is performed so that the stretching ratio of the stretching falls within the aforementioned range of the specific stretching ratio. In the stretching treatment including stretching in two or more directions, stretching is performed so that a product of the stretching ratios of the stretching in the respective directions falls within the aforementioned range of the specific stretching ratio. In the stretching treatment including stretching in two or more directions, stretching in the respective directions may be performed simultaneously or sequentially.

A thickness T2 is 20 μm or less and preferably 15 μm or less, and is preferably 1 μm or more and more preferably 3 μm or more, wherein the thickness T2 is a thickness of the polarizer material film after stretching the layered body, as a result of free end uniaxial stretching of the layered body at a stretching ratio 6.0/X. X herein refers to the stretching ratio for stretching the primary film to produce the polarizer material film. When the T2 is equal to or less than the upper limit value, the thickness of the polarizing plate obtained by the stretching of the layered body can be reduced. When T2 is equal to or more than the lower limit value, a polarizing plate having a sufficiently high polarization degree can be obtained.

[7. Effects of the Present Invention]

The layered body of the present invention has a stretched polarizer material film and a stretched substrate film. That is, upon producing a polarizing plate using the layered body of the present invention, a polarizer material film that has been previously stretched is utilized. Therefore, the stretching ratio upon stretching the layered body to produce the polarizing plate can be decreased. Consequently, the phase difference expressed by the substrate film after the step of stretching of the layered body can be suppressed. As a result, the substrate film as it is can be used as a protective film.

Further, as explained in the above, according to the present invention, the previously stretched film is used as the polarizer material film. Therefore, unlike the cases wherein an unstretched polarizer material film is used, a substrate film having an extremely wide width is unnecessary upon attaching the substrate film to form the layered body, and thereby production of the polarizing plate can be efficiently performed.

Consequently, the present invention can provide a layered body whose substrate film can be used also as a protective film and with which a polarizing plate having a thin thickness can be efficiently produced.

Further, according to the present invention, the angle θ2 formed by the stretching direction of the polarizer material film and the stretching direction of the substrate film is less than 1°, and the stretching ratio of the substrate film is set to be smaller than the stretching ratio of the polarizer material film. Consequently, warping of the polarizing plate can be reduced.

EXAMPLES

Hereinafter, the present invention will be described in more detail with reference to Examples and Comparative Examples. However, the present invention is not limited to the Examples described below. In the following description, "part" and "%" relating to the quantity ratio of components represent parts by weight, unless otherwise specified.

[Evaluation Method]
[Weight-Average Molecular Weight (Mw) and Molecular Weight Distribution (Mw/Mn)]

The molecular weights of the block copolymer and the hydrogenated product of the block copolymer were measured at 38° C. as a standard polystyrene-equivalent value by GPC using THF as an eluent. As the measurement device, HLC8020GPC manufactured by TOSOH CORPORATION was used.

[Hydrogenation Ratio]

The hydrogenation ratio of the hydrogenated product of a block copolymer was calculated by $^1$H-NMR spectrum or GPC analysis. In a region where the hydrogenation ratio was 99% or less, calculation was made on the basis of $^1$H-NMR spectrum measurement. In a region where the hydrogenation ratio exceeds 99%, calculation was made on the basis of the peak area ratio by GPC analysis with a UV detector and an RI detector.

[Method for Measuring In-Plane Phase Difference Re1, Re2 and Nz Factor]

Re and Rth were measured at a wavelength of 590 nm with a phase difference measurement device (product name "Axoscan" manufactured by Axometric), and Nz factor was determined therefrom. The sample for measuring the phase difference Re2 was prepared by free end uniaxial stretching of the substrate film that is identical with the one used for production of the layered body (for example, in the case of Example 1, the substrate film A) at the stretching ratio of 4.0 times under the same temperature condition as that for producing the polarizing plate (except for Example 6 wherein the temperature was 110° C.)

[Method for Measuring Thickness]

The thickness of the primary film before and after stretching, the thickness of the substrate film, and the thickness of each layer contained in a polarizing plate were measured by the following method.

The polarizing plate was cut with a microtome, and a cross section thereof was then observed with TEM. The size in a thickness direction was measured at five positions, and the average of the measured values was adopted as the thickness.

[Evaluation of Bonded Surface State of Layered Body]

The layered body was observed by visual inspection. A case where a streak or a void did not occur was evaluated as "good", and a case where a streak or a void occurred was evaluated as "poor".

[Evaluation of Stretching Property]

Stability in the step of stretching the layered body to produce the polarizing plate was evaluated in accordance with the following criteria.

A: rupture did not occur (zero rupture in 10 film passage).

B: almost no rupture occurred (1 rupture in 10 film passage).

C: rupture frequently occurred, and it was unable to produce a polarizing plate.

[Evaluation of Polarizing Plate Warping]

A tackiness agent was attached to the polarizer side of the polarizing plate, and the polarizing plate was cut out to have a film in a size of 200 mm×290 mm. This film was attached to a glass plate of A4 size having a thickness of 0.7 mm, and left to stand in a high temperature vessel at 80° C. for 500 hours. After the leaving to stand, the sample was placed on a flat table with the concaved surface of the warped glass plate faced upward. The height on four corners were measured and an average thereof was calculated, which was then evaluated in accordance with the following evaluation standard. Lower height is indicative of smaller warp.

A: less than 1.5 mm

B: 1.5 mm or more, and less than 3.0 mm

C: 3.0 mm or more

Example 1

(1-1) Production of Substrate Film (1-1-1) Production of Polymer X

Referring to Production Example described in Japanese Patent Application Laid-Open No. 2002-105151 A, 25 parts of styrene monomer was polymerized at a first stage, 30 parts of styrene monomer and 25 parts of isoprene monomer were polymerized at a second stage, and 20 parts of styrene monomer was polymerized at a third stage to obtain a block copolymer [D1]. The block copolymer was then hydrogenated to synthesize a hydrogenated block copolymer [E1]. The Mw of the hydrogenated block copolymer [E1] was 84,500, the Mw/Mn thereof was 1.20, and the hydrogenation ratio of the main chain and the aromatic ring thereof was almost 100%.

To 100 parts of the hydrogenated block copolymer [E1], 0.1 part of pentaerythrityl tetrakis[3-(3,5-di-t-butyl-4-hydroxyphenyl)propionate] (product name "Songnox1010" manufactured by SONGWON Industrial Co., Ltd.) was mixed by melt-kneading, and made into a form of pellets, to obtain a polymer X for molding.

(1-1-2) Production of Unstretched Film A

The polymer X produced in (1-1-1) was supplied to a hot-melt extrusion film molding device equipped with a T-die. The polymer X was extruded from the T-die and wound on a roll at a taking-up speed of 4 m/min. Thus, the polymer X was molded in a form of a film. As a result, a long-length unstretched film A (thickness of 25 μm) formed of the polymer X was obtained.

(1-1-3) Production of Substrate Film A

The unstretched film A was stretched in a lengthwise direction using a longitudinal uniaxial stretching apparatus at a stretching temperature of 130° C. and a stretching ratio of 2.0, to obtain a substrate film A (longitudinally uniaxial-stretched). The substrate film A had a thickness of 13 μm, and an in-plane direction phase difference of 2 nm.

(1-2) Production of Polarizer Material Film

As the primary film, an unstretched polyvinyl alcohol film (average polymerization degree of about 2,400, saponification degree of 99.9% by mole, thickness of 20 μm, hereinafter also referred to as "PVA20") was used. The primary film was subjected to dry stretching in a lengthwise direction using a longitudinal uniaxial stretching apparatus at a stretching temperature of 130° C. and a stretching ratio of 3.0, to obtain a polarizer material film. The polarizer material film had a thickness T1 of 12 μm, an Re1 of 345 nm, and an Nz factor of 1.0. The angle formed by the stretching direction of the substrate film and the stretching direction of the polarizer material film was 0°.

(1-3) Production of Layered Body

100 Parts by weight of water, 3 parts by weight of a polyvinyl alcohol-based adhesive ("Z-200" manufactured by The Nippon Synthetic Chemical Industry Co., Ltd.), and 0.3 part by weight of a crosslinking agent ("SPM-01" manufactured by The Nippon Synthetic Chemical Industry Co., Ltd.) were mixed to obtain an adhesive composition. A surface of the substrate film A obtained in (1-1-3) was subjected to a corona treatment, coated with the adhesive composition, and bonded to a surface of the polarizer material film. Keeping this state, the adhesive composition was heated and dried at 70° C. for 5 minutes. As a result, a layered body having a layer structure of "polarizer material film"/"adhesion layer"/"substrate film A" was obtained. The adhesive layer had a thickness of 1 μm.

The bonded surface state of the obtained layered body was evaluated. The results are shown in Table 1.

(1-4) Production of Polarizing Plate (Wet)

While the layered body obtained in (1-3) was continuously conveyed in a lengthwise direction through guiding rollers, the following operation was performed.

The aforementioned layered body was subjected to a dyeing treatment of immersing the layered body in a dyeing solution containing iodine and potassium iodide, and to a first stretching treatment of, after the dyeing treatment, stretching the layered body. Subsequently, the layered body after the first stretching treatment was subjected to a second stretching treatment of stretching the layered body in an acidic bath containing boric acid and potassium iodide at 65° C. The total stretching ratio represented by a product of the stretching ratio in the first stretching treatment and the stretching ratio in the second stretching treatment was set to be 2.0. The stretching directions in both the first stretching treatment and the second stretching treatment were the lengthwise direction.

The layered body after the second stretching treatment was dried at 70° C. for 5 minutes in a drying device, to thereby obtain a polarizing plate. The thickness and the phase difference Re2 of the substrate film in the polarizing plate, and the thickness T2 of the polarizer material film were measured and shown in Table 1 together with results of evaluation of warping and stretching property.

Example 2

A polarizing plate was produced by the same manner as that of Example 1 except that the substrate film B obtained in (2-1) below was used instead of the substrate film A, that the polarizer material film obtained in (2-2) below was used instead of the polarizer material film obtained in (1-2), and that the stretching of the layered body was performed such that the total stretching ratio in (1-4) was set to be 4.0. Evaluation was performed by the same manner as that of Example 1. The results are shown in Table 1.

(2-1) Production of Substrate Film B

The unstretched film A obtained in (1-1-2) was stretched in a lengthwise direction using a longitudinal uniaxial stretching apparatus at a stretching temperature of 130° C. and a stretching ratio of 1.2, to obtain a substrate film B (longitudinally uniaxial-stretched). The substrate film B had a thickness of 21 μm, and an in-plane direction phase difference of 2 nm.

(2-2) Production of Polarizing Material Film

As the primary film, an unstretched polyvinyl alcohol film (average polymerization degree of about 2,400, saponification degree of 99.9% by mol, thickness of 30 μm, hereinafter also referred to as"PVA30") was used. The primary film (PVA30) was stretched in the lengthwise direction using a longitudinal uniaxial stretching apparatus at a stretching temperature of 130° C. and a stretching ratio of 1.5, to obtain a polarizer material film. The polarizer material film had a thickness T1 of 24 μm, an Re1 in an in-plane direction of 345 nm, and an Nz factor of 1.0.

Example 3

A polarizing plate was produced by the same manner as that of Example 1 except that the polarizer material film obtained in (3-2) below was used instead of the polarizer material film obtained in (1-2), and that the stretching of the layered body was performed such that the total stretching ratio in (1-4) was set to be 1.2. Evaluation was performed by the same manner as that of Example 1. The results are shown in Table 1.

(3-2) Production of Polarizer Material Film.

The primary film (PVA20) was subjected to stretching in a lengthwise direction using a longitudinal uniaxial stretching apparatus at a stretching temperature of 130° C. and a stretching ratio of 5.0, to obtain a polarizer material film. The polarizer material film had a thickness T1 of 9 μm, an Re1 of 325 nm, and an Nz factor of 1.0.

Example 4

A polarizing plate was produced by the same manner as that of Example 1 except that the substrate film D obtained in (4-1) below was used instead of the substrate film A obtained in (1-1). Evaluation was performed by the same manner as that of Example 1. The results are shown in Table 1.

(4-1) Production of Substrate Film D

The unstretched film A obtained in (1-1-2) was stretched in a lengthwise direction using a longitudinal uniaxial stretching apparatus at a stretching temperature of 130° C. and a stretching ratio of 1.5, and then stretched in a widthwise direction at a stretching ratio of 1.3, to obtain a substrate film D (biaxially longitudinal-stretched). The substrate film D had a thickness of 13 μm, and an in-plane direction phase difference of 1 nm.

Example 5

A polarizing plate was produced by the same manner as that of Example 1 except that the substrate film E obtained in (5-1) below was used instead of the substrate film A obtained in (1-1). Evaluation was performed by the same manner as that of Example 1. The results are shown in Table 2.

(5-1) Production of Substrate Film E (5-1-2) Production of Unstretched Film E

A mixture of the polymer X produced in (1-1-1) and polyisobutene ("Nisseki Polybutene HV-300" manufactured by JX Nippon Oil & Energy Corporation, number average molecular weight of 1,400) added at a ratio of 20 parts by weight relative to 100 parts by weight of the polymer X was supplied to a hot-melt extrusion film molding device equipped with a T-die. The mixture of the polymer X and polyisobutene was extruded from the T-die and wound on a roll at a taking-up speed of 4 m/min to obtain a film-shaped long-length unstretched film E (thickness of 25 μm).

(5-1-3) Production of Substrate Film E

The unstretched film E was stretched in a lengthwise direction using a longitudinal uniaxial stretching apparatus at a stretching temperature of 130° C. and a stretching ratio of 2.0, to obtain a substrate film E (longitudinally uniaxial-stretched). The substrate film E had a thickness of 13 μm, and an in-plane direction phase difference of 2 nm.

Example 6

A polarizing plate was produced by the following method, and evaluation thereof was performed by the same manner as that of Example 1. The results are shown in Table 2.

(6-1) Production of Substrate Film F

An acrylic resin (Sumipex HT55X manufactured by Sumitomo Chemical Co., Ltd.) was supplied to a hot-melt extrusion film molding device equipped with a T-die. The acrylic resin was extruded from the T-die and wound on a roll at a taking-up speed of 4 m/min to mold the acrylic resin in a film shape. Thereby a long-length unstretched film F (thickness of 25 μm) which was formed of the acrylic resin was obtained.

The unstretched film F was used instead of the unstretched film A obtained in (1-1-2). The unstretched film F was stretched in a lengthwise direction using a longitudinal uniaxial stretching apparatus at a stretching temperature of 130° C. and a stretching ratio of 1.3, to obtain a substrate film F (longitudinally uniaxial-stretched). The substrate film F had a thickness of 19 μm, and an in-plane direction phase difference of 2 nm.

(6-3) Production of Layered Body

A layered body having a layer structure of"polarizer material film"/"adhesion layer"/"substrate film F" was obtained by the same manner as that of (1-3) of Example 1 except that the substrate film F produced in (6-1) was used instead of the substrate film A obtained in (1-1-3).

(6-4) Production of Polarizing Plate (Dry)

The layered body obtained in (6-3) was stretched in the lengthwise direction using a longitudinal uniaxial stretching apparatus at a stretching temperature of 110° C. and a stretching ratio of 1.8. The stretched layered body was dyed by immersing it in a dyeing solution containing iodine, potassium iodide, and boric acid, and dried with hot air at 60° C. Subsequently, the dyed layered body was stretched in the lengthwise direction using a longitudinal uniaxial stretching apparatus at a stretching temperature of 90° C. and a stretching ratio of 1.1, to obtain a polarizing plate.

Comparative Example 1

(C1-1) Production of substrate film C1 The unstretched film A obtained in (1-1-2) was stretched in a lengthwise direction using a longitudinal uniaxial stretching apparatus at a stretching temperature of 130° C. and a stretching ratio of 3.5, to obtain a substrate film C1 (longitudinally uniaxial-stretched). The substrate film C1 had a thickness of 13 µm, and an in-plane direction phase difference of 3 nm.

(C1-3) Production of Layered Body

A layered body having a layer structure of "polarizer material film"/"adhesive"/"substrate film C1" was obtained by the same manner as that of (1-3) except that the substrate film C1 was used instead of the substrate film A in (1-3). In Comparative Example 1, the stretching ratio X of the polarizer material film was 3.0 which is smaller than the stretching ratio 3.5 of the substrate film C1.

(C1-4) Production of Polarizing Plate (Wet)

A polarizing plate was produced by the same manner as that of (1-4) except that the layered body obtained in (C1-3) was used instead of the layered body in (1-4). Evaluation was performed by the same manner as that of Example 1. The results are shown in Table 2. The substrate film had a poorer stretching ability than that of the polarizer material film, and rupture occurred in the substrate film, and a stable production of the polarizing plate could not be performed.

Comparative Example 2

(C2-3) Production of Layered Body

By the following procedure, a polyvinyl alcohol (PVA) layer was formed on the surface of the substrate film C2 to produce a layered body.

As the substrate film C2, a continuous web substrate film (thickness of 200 µm) of amorphous polyethylene terephthalate (amorphous PET, glass transition temperature of 75° C.) obtained by copolymerization of 6 mol % isophthalic acid was used. As the PVA aqueous solution for forming the PVA layer, an aqueous solution obtained by dissolving PVA powder having a polymerization degree of 1000 or more, a saponification degree of 99% or more, and a glass transition temperature of 80° C. in water to a concentration of 4 to 5% by weight.

The PVA aqueous solution was applied onto a surface of the substrate film C2 and dried at a temperature of 50 to 60° C. to form PVA layer on the surface of the substrate film C2. Thereby a layered body having a layer structure of "PVA layer"/"substrate film C2" was obtained. Although the PVA layer in this comparative example was formed by application and drying of the PVA aqueous solution, the thickness of the layer and the in-plane phase difference of the layer are shown in the rows of "Thickness T1 after stretching" and "Re1 after stretching", respectively, in Table 2.

(C2-4) Production of Polarizing Plate

The layered body obtained in (C2-3) was subjected to a stretching apparatus installed in an oven set at a stretching temperature environment of 130° C., and free end uniaxial stretching was performed so that the stretching ratio was 1.8 times (first stretching treatment).

A dyeing treatment in which the layered body after the first stretching treatment was immersed in a dyeing solution containing iodine and potassium iodide was performed. Then, the layered body after dyeing treatment was subjected to a stretching apparatus installed in a processing apparatus filled with a boric acid aqueous solution at 65° C. containing boric acid and potassium iodide, and a free end uniaxial stretching treatment was performed so that the stretching ratio was 3.3 times (second stretching treatment). The stretching direction was set in the lengthwise direction for both the first stretching treatment and the second stretching treatment.

The layered body after the second stretching treatment was taken out of the boric acid aqueous solution. Boric acid adhering to the surface of the 3 µm-thick PVA layer formed on the amorphous PET substrate was washed with an aqueous potassium iodide solution, and then the layered body was dried by a drying process using hot air at 60° C. to obtain a polarizing plate. The thickness and phase difference Re2 of the substrate film in the polarizing plate and the thickness T2 of the PVA layer were measured and shown in Table 2 together with the evaluation results of stretching property and warping.

The results of Examples and Comparative Examples are shown in Tables 1 and 2.

In the tables, "Acryl" means an acrylic resin. In the tables, the stretching direction (°) is an angle with respect to the width direction of the film being 0°.

In Table 2, amorphous PET means amorphous polyethylene terephthalate.

TABLE 1

| | | | Ex. 1 | Ex. 2 | Ex. 3 | Ex. 4 |
|---|---|---|---|---|---|---|
| Polarizer material film | Before stretching | Primary film | PVA20 | PVA30 | PVA20 | PVA20 |
| | | Thickness (µm) | 20 | 30 | 20 | 20 |
| | Stretching conditions | Stretching style | Dry Longitudinal uniaxial | Dry Longitudinal uniaxial | Dry Longitudinal uniaxial | Dry Longitudinal uniaxial |
| | | Stretching direction (°) | 90 | 90 | 90 | 90 |
| | | Stretching temperature (° C.) | 130 | 130 | 130 | 130 |
| | | Stretching ratio X | 3.0 | 1.5 | 5.0 | 3.0 |
| | After stretching | T1(µm) | 12 | 24 | 9 | 12 |
| | | Re1(nm) | 345 | 345 | 325 | 345 |
| | | Nz factor | 1 | 1 | 1 | 1 |

TABLE 1-continued

|  |  |  | Ex. 1 | Ex. 2 | Ex. 3 | Ex. 4 |
|---|---|---|---|---|---|---|
| Substrate film | Before stretching | Resin | Polymer X | Polymer X | Polymer X | Polymer X |
|  |  | Thickness (μm) | 25 | 25 | 25 | 25 |
|  |  | Plasticizer, softener | No | No | No | No |
|  | Stretching conditions | Stretching style | Dry Longitudinal uniaxial | Dry Longitudinal uniaxial | Dry Longitudinal uniaxial | Dry Biaxial Longitudinal |
|  |  | Stretching direction (°) | 90 | 90 | 90 | 90 |
|  |  | Stretching temperature (° C.) | 130 | 130 | 130 | 130 |
|  |  | Stretching ratio Y | 2.0 | 1.2 | 2.0 | 1.5 |
|  |  | Transverse stretching ratio | — | — | — | 1.3 |
|  | After stretching | Thickness (μm) | 13 | 21 | 13 | 13 |
|  |  | Phase difference (nm) | 2 | 2 | 2 | 1 |
| Layered body | θ2 (°) |  | 0 | 0 | 0 | 0 |
|  | Relationship of X and Y |  | Y < X | Y < X | Y < X | Y < X |
|  | Bonded surface state |  | Good | Good | Good | Good |
| Polarizing plate | Stretching conditions | Stretching style | Wet Longitudinal uniaxial | Wet Longitudinal uniaxial | Wet Longitudinal uniaxial | Wet Longitudinal uniaxial |
|  |  | Stretching temperature (° C.) | 65 | 65 | 65 | 65 |
|  |  | Stretching ratio | 2.0 | 4.0 | 1.2 | 2.0 |
|  | Evaluation | Substrate thickness μm | 9 | 10 | 11 | 9 |
|  |  | T2 (μm) | 8 | 12 | 8 | 8 |
|  |  | Re2 (nm) | 16 | 16 | 16 | 16 |
|  |  | Warping | A | B | A | A |
|  |  | Stretching property | A | A | A | A |

TABLE 1

|  |  |  | Ex. 1 | Ex. 2 | Comp. Ex. 1 | Comp. Ex. 2 |
|---|---|---|---|---|---|---|
| Polarizer material film | Before stretching | Primary film | PVA20 | PVA20 | PVA20 | PVA layer |
|  |  | Thickness (μm) | 20 | 30 | 20 | — |
|  | Stretching conditions | Stretching style | Dry Longitudinal uniaxial | Dry Longitudinal uniaxial | Dry Longitudinal uniaxial | None |
|  |  | Stretching direction (°) | 90 | 90 | 90 | — |
|  |  | Stretching temperature (° C.) | 130 | 130 | 130 | — |
|  |  | Stretching ratio X | 3.0 | 3.0 | 3.0 | — |
|  | After stretching | T1(μm) | 12 | 12 | 12 | 7 |
|  |  | Re1(nm) | 345 | 345 | 325 | 3 |
|  |  | Nz factor | 1 | 1 | 1 | — |
| Substrate film | Before stretching | Resin | Polymer X | Acryl | Polymer X | Amorphous PET |
|  |  | Thickness (μm) | 25 | 25 | 25 | 200 |
|  |  | Plasticizer, softener | Yes | No | No | No |
|  | Stretching conditions | Stretching style | Dry Longitudinal uniaxial | Dry Longitudinal uniaxial | Dry Longitudinal uniaxial | None |
|  |  | Stretching direction (°) | 90 | 90 | 90 | — |
|  |  | Stretching temperature (° C.) | 130 | 130 | 130 | — |
|  |  | Stretching ratio Y | 2.0 | 1.3 | 3.5 | — |
|  |  | Transverse stretching ratio | — | — | — | — |
|  | After stretching | Thickness (μm) | 13 | 19 | 13 | — |
|  |  | Phase difference (nm) | 2 | 2 | 3 | — |
| Layered body | θ2 (°) |  | 0 | v0 | 0 | — |
|  | Relationship of X and Y |  | Y < X | Y < X | Y > X | — |
|  | Bonded surface state |  | Good | Good | Good | — |

TABLE 1-continued

|  |  |  | Ex. 1 | Ex. 2 | Comp. Ex. 1 | Comp. Ex. 2 |
|---|---|---|---|---|---|---|
| Polarizing plate | Stretching conditions | Stretching style | Wet Longitudinal uniaxial | Dry Longitudinal uniaxial | Wet Longitudinal uniaxial | Wet Longitudinal uniaxial |
|  |  | Stretching temperature (° C.) | 65 | 110 | 65 | 65 |
|  |  | Stretching ratio | 2.0 | 2.0 | 2.0 | 5.9 |
|  | Evaluation | Substrate thickness μm | 9 | 14 | — | 82 |
|  |  | T2 (μm) | 8 | 8 | — | 3 |
|  |  | Re2 (nm) | 16 | 10 | — | 5800 |
|  |  | Warping | A | A | — | C |
|  |  | Stretching property | A | A | C | A |

It is apparent from the results shown in Tables 1 and 2 that, according to the present invention, the phase difference that is expressed in the substrate film after the step of stretching the layered body can be reduced, and occurrence of rupture can be prevented, whereby the substrate film can be used also as a protective film, and a thin polarizing plate can be produced efficiently.

REFERENCE SIGN LIST 1 primary film
2 unstretched film
10 layered body
11 polarizer material film
12 substrate film
13 adhesive
100 polarizing plate
111 polarizer material film
112 substrate film
113,114 adhesive layer
115 protective film
120 polarizing plate having protective film
200 production apparatus
201,202 feeding device
203 winding device
204, 206 stretching device
205 bonding device
300 production apparatus
301,307 feeding device
302-305 treatment device
306,309 drying device
308 bonding device
310 winding device

The invention claimed is:

1. A layered body comprising a polarizer material film that is a product of stretching in one or more directions, and a substrate film provided on the polarizer material film, the substrate film being a product of stretching in one or more directions, wherein
a stretching ratio X of the polarizer material film is 1.5 or more and 5.5 or less,
a thickness T2 is 20 μm or less, the thickness T2 being a thickness of the polarizer material film as a result of free end uniaxial stretching of the layered body at a stretching ratio 6.0/X,
an angle θ2 formed by a stretching direction of the polarizer material film and a stretching direction of the substrate film is less than 1°,
a stretching ratio Y of the substrate film is smaller than the stretching ratio X of the polarizer material film, and
an in-plane phase difference Re2 of the substrate film is 0 nm or more and 20 nm or less, the Re2 being an in-plane phase difference generated as a result of free end uniaxial stretching of the substrate film at 4.0 times under a temperature condition of 50° C. to 120° C.

2. The layered body according to claim 1, wherein the polarizer material film is a polarizer material film obtained by dry stretching.

3. The layered body according to claim 1, wherein an Nz factor of the polarizer material film is 0.95 or more and 1.5 or less.

4. The layered body according to claim 1, wherein the substrate film is a film formed of at least one type selected from a cycloolefin resin, an amorphous polyester resin, a polyolefin resin, and an acrylic resin.

5. The layered body according to claim 1, wherein
the substrate film is a film formed of a cycloolefin resin,
the cycloolefin resin contains a cycloolefin-based polymer, and
the cycloolefin-based polymer is formed of at least one type selected from a hydrogenated product of a ring opening polymer of a norbornene-based monomer, an addition copolymer of a norbornene-based monomer and an α-olefin, and a hydrogenated product thereof.

6. The layered body according to claim 1, wherein
the substrate film is a film formed of a cycloolefin resin,
the cycloolefin resin contains a cycloolefin-based polymer, and
the cycloolefin-based polymer is composed of a hydrogenated product of a block copolymer obtained by hydrogenating a block copolymer [D] composed of:
a polymer block [A] containing a repeating unit [I] derived from an aromatic vinyl compound as a main component; and
a polymer block [B] containing the repeating unit [I] derived from an aromatic vinyl compound and a repeating unit [II] derived from a chain conjugated diene compound as a main component or a polymer block [C] containing the repeating unit [II] derived from a chain conjugated diene compound as a main component.

7. The layered body according to claim 1, wherein the substrate film contains a plasticizer and/or a softener.

8. The layered body according to claim 7, wherein the plasticizer and/or softener is an ester-based plasticizer, an aliphatic hydrocarbon polymer or a mixture thereof.

* * * * *